(12) United States Patent
Brehob et al.

(10) Patent No.: US 7,426,918 B2
(45) Date of Patent: Sep. 23, 2008

(54) ENGINE HAVING MULTIPLE INJECTOR LOCATIONS

(75) Inventors: Diana Brehob, Dearborn, MI (US); Donald J. Lewis, Howell, MI (US); Graham Hoare, Bulphan (GB)

(73) Assignee: Ford Global Technologies, LLC, Dearborn, MI (US)

(*) Notice: Subject to any disclaimer, the term of this patent is extended or adjusted under 35 U.S.C. 154(b) by 37 days.

(21) Appl. No.: 11/385,224

(22) Filed: Mar. 20, 2006

(65) Prior Publication Data
US 2007/0215112 A1    Sep. 20, 2007

(51) Int. Cl.
*F02B 7/00* (2006.01)
*F02D 7/00* (2006.01)

(52) U.S. Cl. .................. 123/431; 123/481; 123/295

(58) Field of Classification Search .......... 123/431, 123/305, 304, 295, 300, 299, 481, 472, 575, 123/672; 60/285, 274
See application file for complete search history.

(56) References Cited

U.S. PATENT DOCUMENTS

| | | | | |
|---|---|---|---|---|
| 5,477,830 A * | 12/1995 | Beck et al. | ............... | 123/470 |
| 6,340,014 B1 * | 1/2002 | Tomita et al. | ............... | 123/295 |
| 6,978,763 B2 * | 12/2005 | Ohtani | ............... | 123/430 |
| 7,055,503 B2 * | 6/2006 | Shibagaki | ............... | 123/431 |
| 7,249,454 B2 * | 7/2007 | Ichise et al. | ............... | 60/285 |
| 7,269,941 B2 * | 9/2007 | Ichise et al. | ............... | 60/284 |
| 2006/0107650 A1 * | 5/2006 | Tokuda | ............... | 60/284 |

FOREIGN PATENT DOCUMENTS

| | | |
|---|---|---|
| JP | 10176574 | 6/1998 |
| JP | 20000265877 | 9/2000 |
| JP | 20000352335 | 12/2000 |
| JP | 20001003785 | 1/2001 |
| JP | 2004028024 | 1/2004 |
| JP | 2004044505 | 2/2004 |
| JP | 2004044506 | 2/2004 |
| JP | 2005113693 | 4/2005 |
| JP | 2005146893 | 6/2005 |

* cited by examiner

*Primary Examiner*—Hai H Huynh
(74) *Attorney, Agent, or Firm*—Julia Voutyras; Alleman Hall McCoy Russell & Tuttle, LLP (57) ABSTRACT

A method for controlling a first and second injector of an engine, the first injector located in a first cylinder of the engine and the second injector located upstream of, and configured to inject fuel into, the first and a second cylinder of the engine, the method comprising of decreasing total injection from the first and second injectors when decreasing injection from the second injector, and increasing total injection from the first and second injectors when increasing injection of the second injector.

18 Claims, 5 Drawing Sheets

ENGINE HAVING MULTIPLE INJECTOR LOCATIONS

BACKGROUND AND SUMMARY

Vehicle engines have utilized various forms of carburetion and fuel injection. For example, one type of fuel injection that may be used is port injection, where each cylinder of the engine has an injector in the cylinder intake port, sometimes referred to as multi-port fuel injection. Another type of fuel injection that may be used is direct cylinder injection, in which each cylinder of the engine has an injector coupled in the cylinder (either overhead or side-mounted) for injecting fuel directly into the cylinder. Still another type of fuel injection that may be used is central, or throttle body, injection, where a centrally located fuel injector delivers fuel into an intake manifold that feeds a plurality of cylinders.

In some examples, engine may use multiple types of injection in an engine to achieve various results. For example, as described in U.S. Pat. No. 6,786,201 or U.S. Pat. No. 5,924,405, direct injection with a sub-injector, or auxiliary injector, is used. In one embodiment, the amount of fuel to be injected is split between the two injection locations to avoid impinging fuel onto the piston.

However, the inventors herein have recognized a problem with the above approaches relating to the transient responses among the different injection locations. For example, injection from injectors located outside the cylinder, such as in the intake manifold, can result in fuel stored in or on the intake manifold. Thus, when changing or transitioning injection among different locations, errors in air-fuel ratio may result due to filling or emptying of fuel stored within the manifold, on manifold walls, and puddles at intake ports.

In one particular example, when changing allocation from auxiliary injection to direct injection, the overall air-fuel ratio may be too rich due to residual fuel in intake manifold being pulled into the cylinder even after auxiliary injection is stopped or reduced. Likewise, when changing to increase or begin auxiliary injection, the air-fuel ratio may be temporarily too lean due to losses of fuel from auxiliary injector to manifold surfaces and filling the manifold with air-fuel mixture.

To address at least some of the above issues, a method for controlling a first and second injector of an engine, the first injector located in a first cylinder of the engine and the second injector located upstream of, and configured to inject fuel into, the first and a second cylinder of the engine, is provided. The method comprises: decreasing total injection from the first and second injectors when decreasing injection from the second injector; and increasing total injection from the first and second injectors when increasing injection of the second injector.

In this way, it is possible to adjust fuel injection of the first and/or second injectors during transitions to account for the differences in transient performance of different injector locations, and thereby better maintain air-fuel ratio control. For example, when decreasing injection from the second injector (and possibly increasing injection from the first injector), total fuel injection can be temporarily decreased to account for fuel stored in the intake manifold. Likewise, when increasing injection from the second injector (and possibly decreasing injection from the first injector), total fuel injection can be temporarily increased to account for fuel that will be stored in the intake manifold.

DETAILED DESCRIPTION

Figure 1:
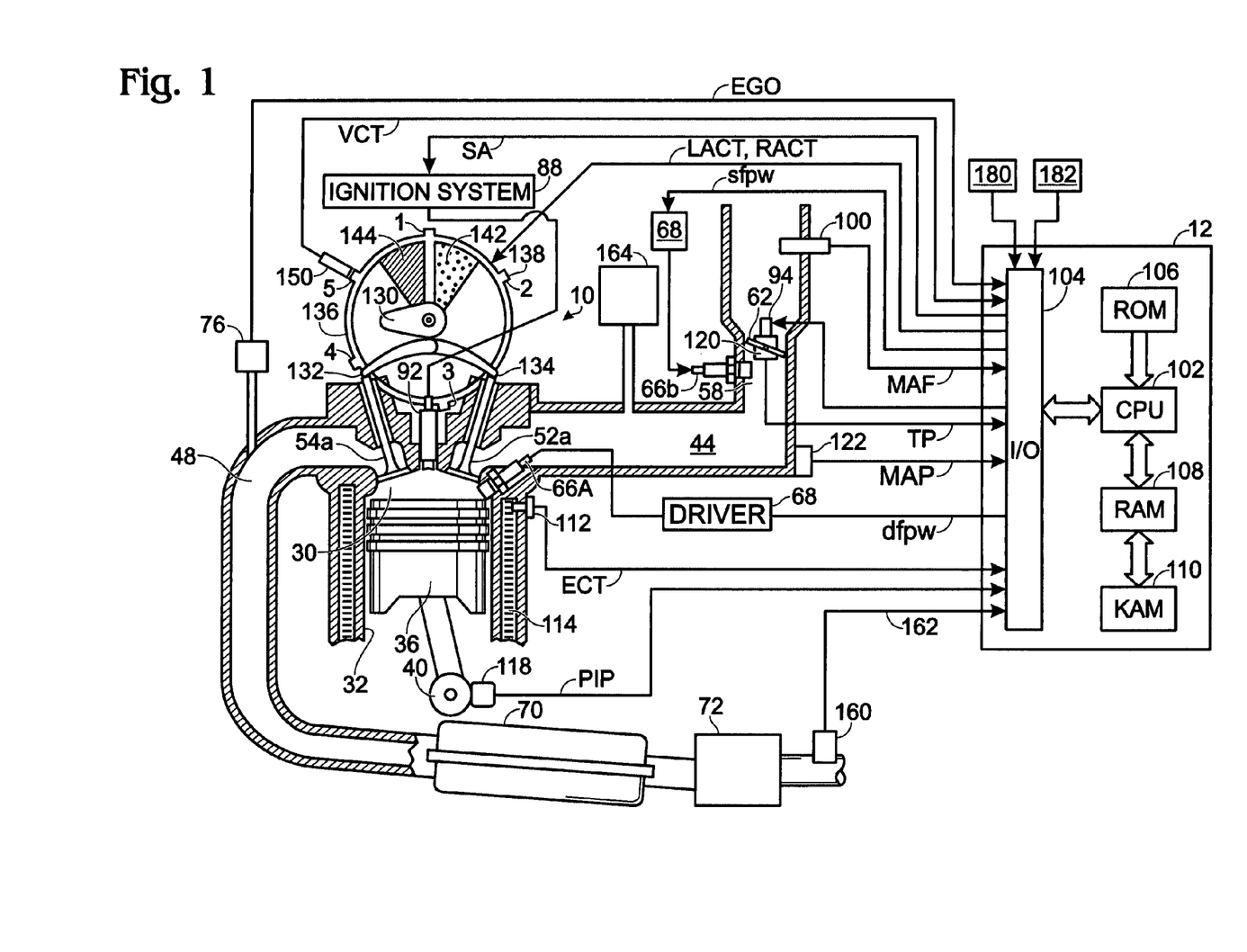
FIG. 1 is a block diagram of a partial engine view.

FIG. 1 shows one cylinder of a multi-cylinder engine, as well as the intake and exhaust path connected to that cylinder. In the embodiment shown in FIG. 1, engine 10 is capable of using different injector locations in one example. The injectors in different locations may be different sized injectors, operate at different fuel pressures, or have other different operating parameters.

FIG. 1 shows one example fuel system with a direct fuel injector in each cylinder, and a supplemental injector for delivering fuel to more than one cylinder. The supplemental injector may be configured in various locations, such as in the intake manifold, in the throttle body, or others as described in more detail below herein.

Continuing with FIG. 1, it shows a dual injection system, where engine 10 has both direct and supplemental fuel injection, as well as spark ignition. Internal combustion engine 10, comprising a plurality of combustion chambers, is controlled by electronic engine controller 12. Combustion chamber 30 of engine 10 is shown including combustion chamber walls 32 with piston 36 positioned therein and connected to crankshaft 40. A starter motor (not shown) may be coupled to crankshaft 40 via a flywheel (not shown), or alternatively direct engine starting may be used.

In one particular example, piston 36 may include a recess or bowl (not shown) to help in forming stratified charges of air and fuel, if desired. However, in an alternative embodiment, a flat piston may be used.

Combustion chamber, or cylinder, 30 is shown communicating with intake manifold 44 and exhaust manifold 48 via respective intake valves 52a and 52b (not shown), and exhaust valves 54a and 54b (not shown). Thus, while four valves per cylinder may be used, in another example, a single intake and single exhaust valve per cylinder may also be used. In still another example, two intake valves and one exhaust valve per cylinder may be used.

Fuel injector 66A is shown directly coupled to combustion chamber 30 for delivering injected fuel directly therein in proportion to the pulse width of signal dfpw received from controller 12 via electronic driver 68. While FIG. 1 shows injector 66A as a side injector, it may also be located overhead of the piston, such as near the position of spark plug 92. Such a position may improve mixing and combustion due to the lower volatility of some alcohol based fuels. Alternatively, the injector may be located overhead and near the intake valve to improve mixing.

Fuel may be delivered to fuel injector 66A by a high pressure fuel system (not shown) including a fuel tank, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tank (or tanks) may (each) have a pressure transducer providing a signal to controller 12.

Fuel injector 66B is shown coupled to intake manifold 44, rather than directly to cylinder 30. Fuel injector 66B delivers injected fuel in proportion to the pulse width of signal sfbw received from controller 12 via electronic driver 68. Injector 66B may also be coupled in throttle body near throttle 120, in an alternative embodiment. It may be coupled upstream or downstream of throttle 120, or coupled upstream or downstream of a fuel vapor entry location from system 164. Note that a single driver 68 may be used for both fuel injection systems, or multiple drivers may be used. Fuel vapor storage system 164 is also shown in schematic form delivering vapors to intake manifold 44.

Intake manifold 44 is shown communicating with throttle body 58 via throttle plate 62. In this particular example, throttle plate 62 is coupled to electric motor 94 so that the position of elliptical throttle plate 62 is controlled by controller 12 via electric motor 94. This configuration may be referred to as electronic throttle control (ETC), which can also be utilized during idle speed control. In an alternative embodiment (not shown), a bypass air passageway is arranged in parallel with throttle plate 62 to control inducted airflow during idle speed control via an idle control by-pass valve positioned within the air passageway.

Exhaust gas sensor 76 is shown coupled to exhaust manifold 48 upstream of catalytic converter 70 (where sensor 76 can correspond to various different sensors). For example, sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS may be used to advantage during feedback air/fuel control to maintain average air/fuel at stoichiometry during a stoichiometric homogeneous mode of operation. Further details of air-fuel ratio control are included herein.

Distributorless ignition system 88 provides ignition spark to combustion chamber 30 via spark plug 92 in response to spark advance signal SA from controller 12.

Controller 12 may cause combustion chamber 30 to operate in a variety of combustion modes, including a homogeneous air/fuel mode and a stratified air/fuel mode by controlling injection timing, injection amounts, spray patterns, etc. Further, combined stratified and homogenous mixtures may be formed in the chamber. In one example, stratified layers may be formed by operating injector 66A during a compression stroke. In another example, a homogenous mixture may be formed by operating one or both of injectors 66A and 66B during an intake stroke (which may be open valve injection). In yet another example, a homogenous mixture may be formed by operating one or both of injectors 66A and 66B before an intake stroke (which may be closed valve injection). In still other examples, multiple injections from one or both of injectors 66A and 66B may be used during one or more strokes (e.g., intake, compression, exhaust, etc.). Even further examples may be where different injection timings and mixture formations are used under different conditions, as described below.

Controller 12 can control the amount of fuel delivered by fuel injectors 66A and 66B so that the homogeneous, stratified, or combined homogenous/stratified air/fuel mixture in chamber 30 can be selected to be at stoichiometry, a value rich of stoichiometry, or a value lean of stoichiometry.

Emission control device 72 is shown positioned downstream of catalytic converter 70. Emission control device 72 may be a three-way catalyst or a NOx trap, or combinations thereof.

Controller 12 is shown as a microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; absolute Manifold Pressure Signal MAP from sensor 122; an indication of knock from knock sensor 182; and an indication of absolute or relative ambient humidity from sensor 180. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In a one example, sensor 118, which is also used as an engine speed sensor, produces a predetermined number of equally spaced pulses every revolution of the crankshaft.

In this particular example, temperature of the catalytic converters may be measured from sensors or estimated based on operating conditions, or combinations thereof.

Continuing with FIG. 1, a variable camshaft timing system is shown. Specifically, camshaft 130 of engine 10 is shown communicating with rocker arms 132 and 134 for actuating intake valves 52a, 52b and exhaust valves 54a, 54b. Camshaft 130 is directly coupled to housing 136. Housing 136 forms a toothed wheel having a plurality of teeth 138. Housing 136 is hydraulically coupled to an inner shaft (not shown), which is in turn directly linked to camshaft 130 via a timing chain (not shown Therefore, housing 136 and camshaft 130 rotate at a speed substantially equivalent to the inner camshaft. The inner camshaft rotates at a constant speed ratio to crankshaft 40. However, by manipulation of the hydraulic coupling as will be described later herein, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valves 52a, 52b and exhaust valves 54a, 54b open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52a, 52b, and exhaust valves 54a, 54b open and close at a time later than normal relative to crankshaft 40.

Teeth 138, being coupled to housing 136 and camshaft 130, allow for measurement of relative cam position via cam timing sensor 150 providing signal VCT to controller 12. Teeth 1, 2, 3, and 4 are preferably used for measurement of cam timing and are equally spaced (for example, in a V-8 dual bank engine, spaced 90 degrees apart from one another) while tooth 5 is preferably used for cylinder identification, as described later herein. In addition, controller 12 sends control signals (LACT, RACT) to conventional solenoid valves (not shown) to control the flow of hydraulic fluid either into advance chamber 142, retard chamber 144, or neither.

Relative cam timing can be measured in a variety of ways. In general terms, the time, or rotation angle, between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

Sensor 160 may also provide an indication of air-fuel ratio in the exhaust gas via signal 162, which provides controller 12 a voltage indicative of the O2 concentration. For example, sensor 160 can be a HEGO, UEGO, EGO, or other type of exhaust gas sensor. Also note that, as described above with regard to sensor 76, sensor 160 can correspond to various different sensors.

As described above, FIG. 1 merely shows one cylinder of a multi-cylinder engine, and that each cylinder has its own set of intake/exhaust valves, fuel injectors, spark plugs, etc.

Also, in the example embodiments described herein, the engine may be coupled to a starter motor (not shown) for starting the engine. The starter motor may be powered when the driver turns a key in the ignition switch on the steering column or actuates an automatic starting button, for example. The starter is disengaged after engine starting, for example, by engine 10 reaching a predetermined speed after a predetermined time. Further, in the disclosed embodiments, an exhaust gas recirculation (EGR) system may route a desired portion of exhaust gas from exhaust manifold 48 to intake manifold 44 via an EGR valve (not shown). Alternatively, a portion of combustion gases may be retained in the combustion chambers by controlling exhaust valve timing.

The engine 10 operates in various modes, including lean operation, rich operation, and "near stoichiometric" operation. "Near stoichiometric" operation refers to oscillatory operation around the stoichiometric air fuel ratio. Typically, this oscillatory operation is governed by feedback from exhaust gas oxygen sensors. In this near stoichiometric operating mode, the engine is operated within approximately one air-fuel ratio of the stoichiometric air-fuel ratio. This oscillatory operation is typically on the order of 1 Hz, but can vary faster and slower than 1 Hz. Further, the amplitude of the oscillations are typically 0.5 a/f from stoichiometric; but can vary depending on operating conditions. Note that this oscillation does not have to be symmetrical in amplitude or time. Further note that an air-fuel bias can be included, where the bias is adjusted slightly lean, or rich, of stoichiometry (e.g., within 1 a/f ratio of stoichiometry). Also note that this bias and the lean and rich oscillations can be governed by an estimate of the amount of oxygen stored in upstream and/or downstream three way catalysts.

As described below, feedback air-fuel ratio control is used for providing the near stoichiometric operation. Further, feedback from exhaust gas oxygen sensors can be used for controlling air-fuel ratio during lean and during rich operation. In particular, a switching type, heated exhaust gas oxygen sensor (HEGO) can be used for stoichiometric air-fuel ratio control by controlling fuel injected (or additional air via throttle or VCT) based on feedback from the HEGO sensor and the desired air-fuel ratio. Further, a UEGO sensor (which provides a substantially linear output versus exhaust air-fuel ratio) can be used for controlling air-fuel ratio during lean, rich, and stoichiometric operation. In this case, fuel injection (or additional air via throttle or VCT) can be adjusted based on a desired air-fuel ratio and the air-fuel ratio from the sensor. Further still, individual cylinder air-fuel ratio control could be used, if desired. As described in more detail below, adjustments may be made with injector 66A, 66B, or combinations therefore depending on various factors.

Also note that various methods can be used to maintain the desired torque such as, for example, adjusting ignition timing, throttle position, variable cam timing position, exhaust gas recirculation amount, and number of cylinders carrying out combustion. Further, these variables can be individually adjusted for each cylinder to maintain cylinder balance among all the cylinders.

One potential limitation in utilizing direct injection of fuel, when used as the sole source of fuel supply, is dynamic range. To provide sufficient fuel flow so that all the desired fuel can be delivered at the highest speed and torque conditions contemplated, the metering accuracy of the injector may be degraded at the shortest fuel pulse widths. Such degraded metering accuracy may lead to increased emissions and/or uneven speed control at idle. This problem may be exacerbated with pressure charging, such as with a turbocharger, in which even more fuel is demanded when the cylinder is pressurized. The present application addresses this issue, at least under some conditions, by providing fuel from both the auxiliary and direct injectors when the fuel demand exceeds that which can be supplied by the direct injector, as described in more detail herein. In such a configuration with two injectors supplying any given cylinder, the dynamic range of both of the injectors is lessened. The advantage is that the fuel metering accuracy may be improved allowing for better control of idle speed and exhaust emissions at low torque.

Figure 2:
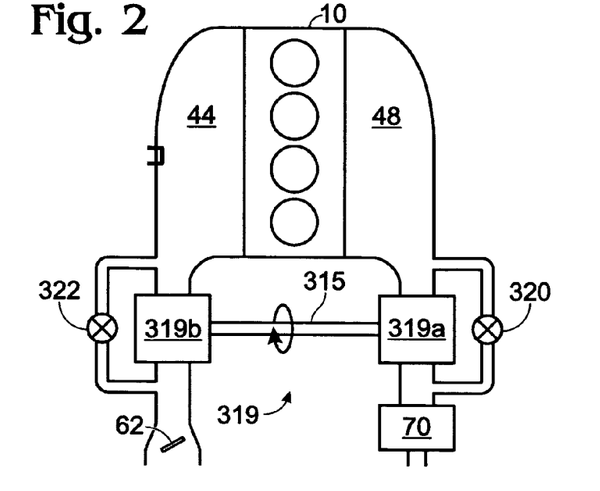
FIG. 2 shows an engine with a turbocharger.

Referring now to FIG. 2, an example engine 10 is shown with four in-line cylinders. In one embodiment, engine 10 may have a turbocharger 319, which has a turbine 319a coupled in the exhaust manifold 48 and a compressor 319b coupled in the intake manifold 44. While FIG. 2, does not show an intercooler, one may optionally be used. Turbine 319a is typically coupled to compressor 319b via a drive shaft 315. Various types of turbochargers and arrangements may be used. For example, a variable geometry Turbocharger (VGT) may be used where the geometry of the turbine and/or compressor may be varied during engine operation by controller 12. Alternately, or in addition, a variable nozzle turbocharger (VNT) may be used when a variable area nozzle is placed upstream and/or downstream of the turbine in the exhaust line (and/or upstream or downstream of the compressor in the intake line) for varying the effective expansion or compression of gasses through the turbocharger. Still other approaches may be used for varying expansion in the exhaust, such as a waste gate valve. FIG. 2, shows an example bypass valve 320 around turbine 319a and an example bypass valve 322 around compressor 319b, where each valve may be controller via controller 12. As noted above, the valves may be located within the turbine or compressor, or may be a variable nozzle.

Also, a twin turbocharger arrangement, and/or a sequential turbocharger arrangement, may be used if desired. In the case of multiple adjustable turbocharger and/or stages, it may be desirable to vary a relative amount of expansion though the turbocharger, depending on operating conditions (e.g. manifold pressure, airflow, engine speed, etc.). Further, a supercharger may be used, if desired.

Figure 3:
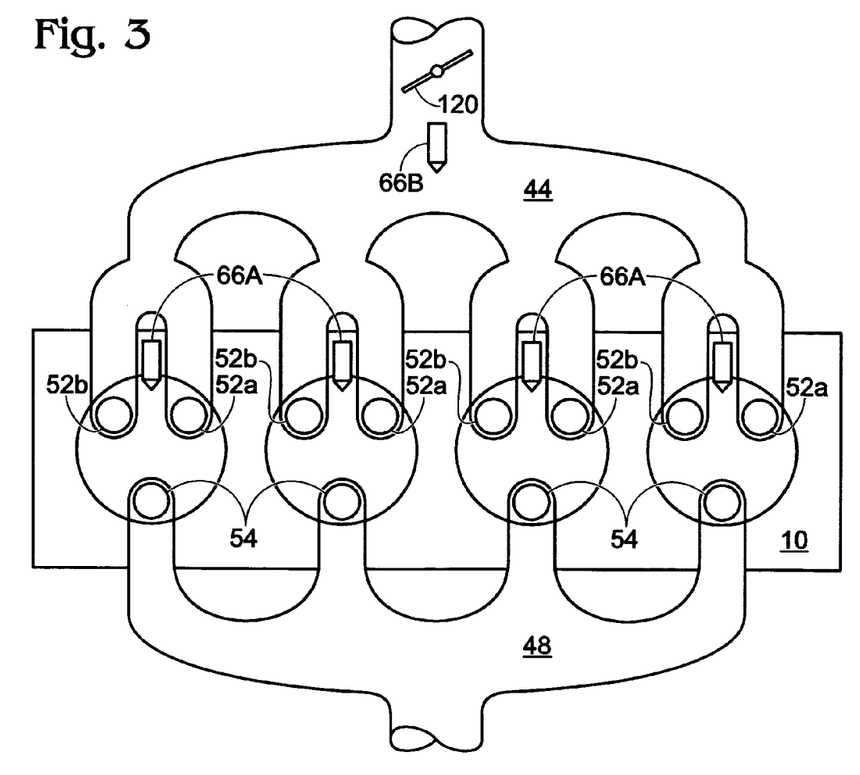
FIG. 3 shows an engine group with an intake and exhaust manifold and multiple injector locations.
Figure 4:
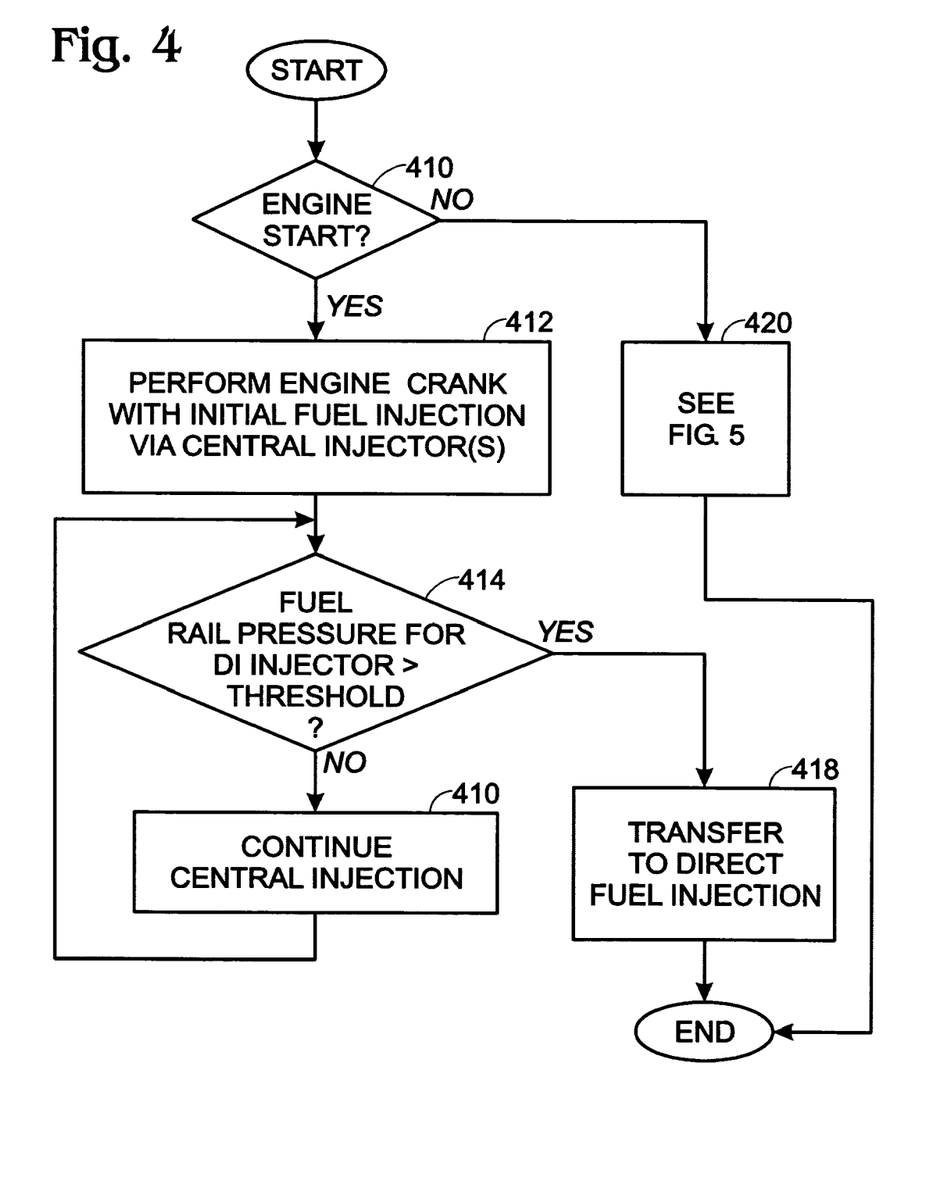
FIGS. 4-6 show high level flow charts of various control operations.

Referring now to FIG. 3, engine 10 is shown having three valves per cylinder (two intake valves 52a and 52b and one exhaust valve 54) with intake manifold 44 and exhaust manifold 48. FIG. 4 illustrates a central location of injector 66B in which injector 66B can deliver fuel to a plurality of cylinders, specifically four in this example. The four-cylinder may be an in-line 4 cylinder engine or a bank of a V-8 engine for example. Further, as noted herein, different locations of injector 66B may be used and different number of cylinders may be used.

Figure 5:
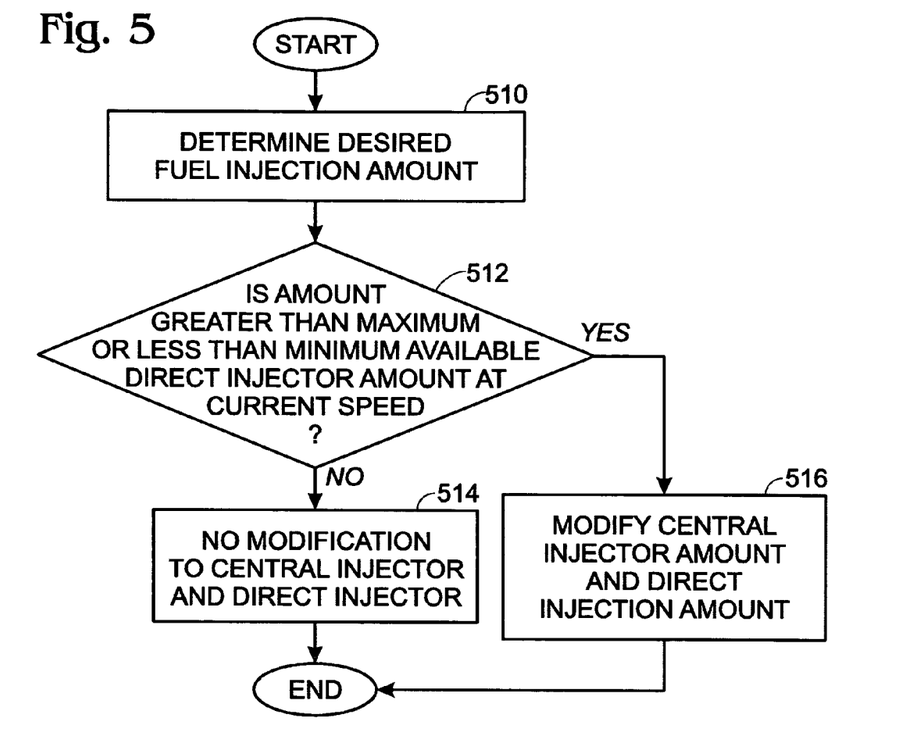
Figure 6:
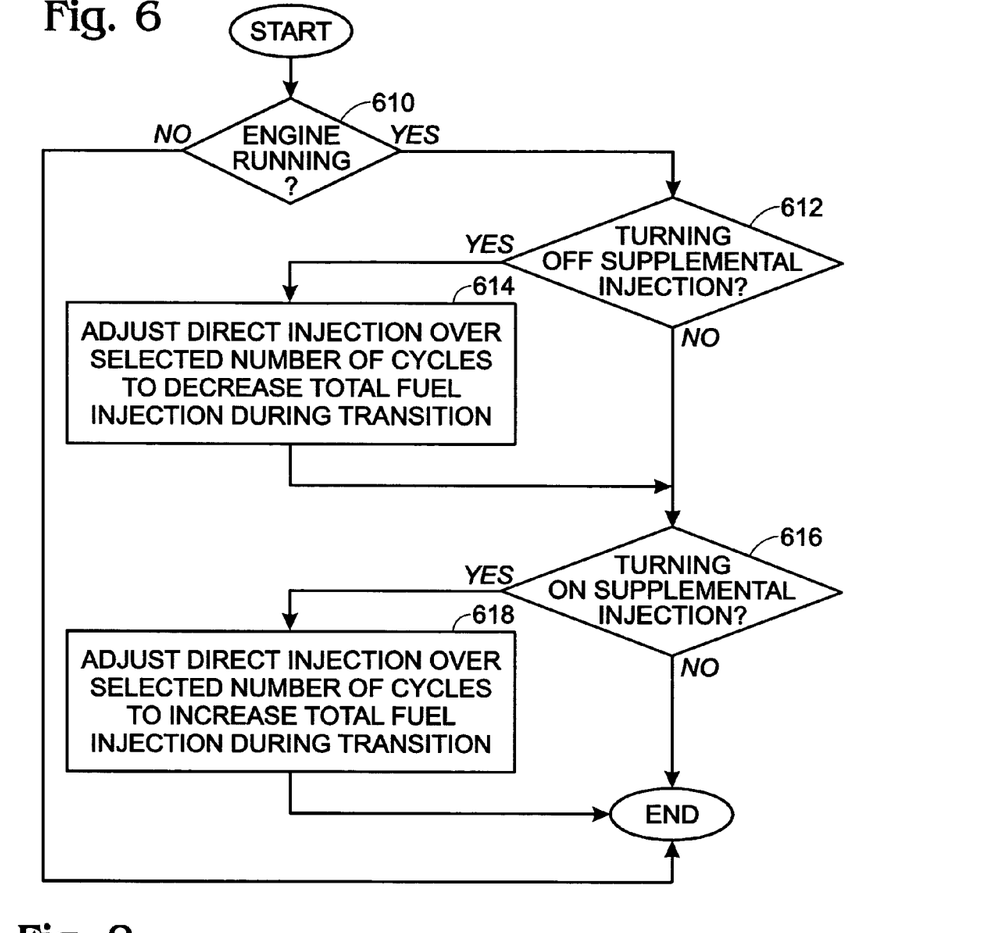

Referring now to FIGS. 4-6, a various routines are described for controlling engine operation, including fuel injection and adjustments to fuel injection during transitions in relative amounts of fuel injection locations.

In FIG. 4, at 410, the routine determines whether an engine start is present. If so, the routine continues to 412 to perform engine cranking with initial fuel injection via supplemental injector(s) 66B. Specifically, under some conditions, initial fuel injection is performed only via supplemental injector(s) and little or no fuel is injected directly via injector(s) 66A. In this way, well mixed air and fuel can be provided for improved combustion during a start even when fuel pressure is lower than a threshold. Then, once fuel rail pressure reaches the threshold via 414 and 416, the routine continues to 418 to transition to direct fuel injection via injectors 66A. This transition is performed, and injection between the injectors is adjusted, to take into account residual injected fuel from injector(s) 66B in the intake manifold that may take several cycles to clear, as described in more detail below with regard to FIGS. 6-8, for example. The adjustments may be based on models or estimates of fuel vapors and/or liquid fuel stored in the intake manifold, for example.

Specifically regarding the transitions, in one example, fuel injection (and optionally airflow) is adjusted to manage fuel that is in the manifold from the supplemental injectors, since there may be transport delays, mixing delays, and wall wetting/puddling delays that are different between the supplemental injector and direct injector. For example, if supplemental injection is used during an engine cold start, there may be some fuel condensing on intake manifold walls and other cold surfaces. Further, there is a combustible mixture in the intake manifold that affects future cylinder induction events for a given number of events depending on manifold size, cylinder size, engine breathing, and mixing. Thus, the additional fuel when decreasing supplemental injection, or additional fuel needed when increasing supplemental injection, can be considered and managed to reduce air-fuel ratio excursions in the exhaust. For example, the system may inject more than the amount of fuel desired in the combustion chamber when enabling or increasing supplement injection recognizing that some fuel may be held on the manifold walls or in the intake manifold volume. Additionally, when switching from supplemental injection to direct injection, for example, less fuel may be temporarily injected than desired in the cylinders because additional fuel is coming form the manifold walls or the manifold volume.

Returning to FIG. 4, when the answer to 410 is no, the routine continues to 420 and calls the routine of FIG. 5. Referring now to FIG. 5, in 510, the routine first determines a desired fuel injection amount based on operating conditions, such as engine airflow, desired torque, temperature, and various additional parameters, for example. Next, in 512, the routine determines whether the desired amount is greater than a maximum direct injection amount per cylinder or less than a minimum direct injection amount per cylinder at the current conditions, such as engine speed and temperature.

If so, the routine continues to 516 to modify the central injection amount and direction injection amounts. For example, if reaching the maximum direct injection amount, additional fuel may be injected via the central injector, or if reaching the minimum direct injection amount, less fuel may be injected via the central injector. Alternatively, if the answer to 512 is no, the routine continues to 514 where no modifications or adjustments are made to account for minimum or maximum flow phenomena.

Turning now to FIG. 6, in 610 the routine first determines whether the engine is running (e.g., not shutting down, etc.). If so, the routine continues to 612 to determine whether the supplemental injector is being disabled, or turned-off, or adjusted to inject less fuel, or a direct injector is being enabled, for example. If so, the routine continues to 614 to adjust fuel injection of a selected number of cycles to decrease a total amount of fuel injected, possibly from multiple injection locations during the transition. In this way, it is possible to compensate for remaining fuel in the intake manifold delivered to the cylinders from previous supplemental injections.

Continuing with FIG. 6, in 616 the routine determines whether the supplemental injector is being enabled, or turned-on, adjusted to inject more fuel, or a direct injector is being disabled, for example. If so, the routine continues to 618 to adjust fuel injection of a selected number of cycles to increase a total amount of fuel injected, possibly from multiple injection locations during the transition. In this way, it is possible to compensate for fuel injected but held in the intake manifold and not delivered to the cylinders during the transition.

Figure 7:
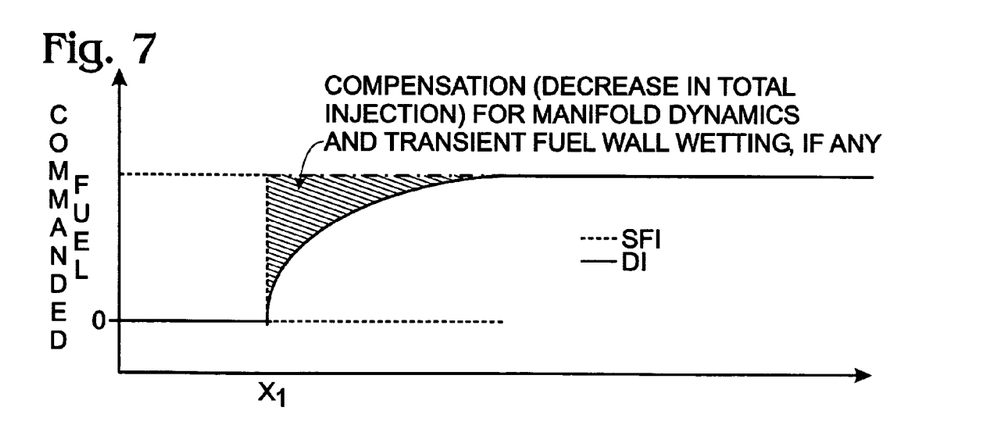
FIGS. 7-8 show graphs of example operation.
Figure 8:
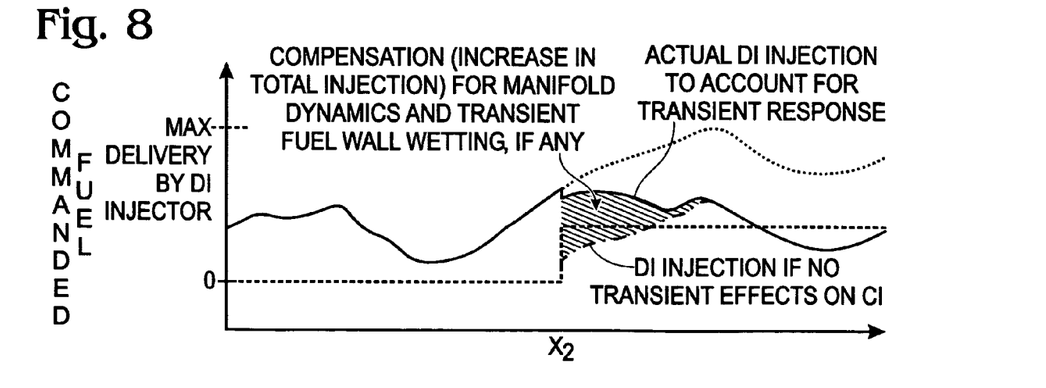

Example operation is now illustrated in the prophetic examples of FIGS. 7-8, which illustrate injector pulsewidth versus time or a number of cycles. The graphs show example pulsewidth values that are not necessary to scale, as direct injectors may be sized substantially differently than supplemental injectors due to rail pressure differences, the number of cylinders the supplemental injector supplies, etc.

FIG. 7 shows operation transitioning from supplemental injection in dashed to direct injection in solid. A transition occurs at x1 in which supplemental injection is disabled and direct injection begins. To maintain a cylinder and/or exhaust air-fuel ratio about a desired value (e.g., stoichiometry), the direct injection does not immediately jump to the equivalent fuel flow value (dash dot line). Rather, it gradually rises over several engine cycles to account for fuel entering the cylinders from previous operation of the supplemental injector. The hatched region represents the decrease in injector fuel from the direct injector during the transition, and thus approximately the amount of fuel received that was stored in the intake manifold.

While FIG. 7 shows an example at relatively fixed airflow, the principles can be applied to variable airflow conditions, such as FIG. 8, which shows a transition where supplemental injection is enabled. In this example, at x2, a supplemental injector is enabled, however, the direct injection does not immediately decrease by a corresponding amount to the total equivalent flow indicated by the dash dot line. Further, not all of the supplemental injection is stored in the manifold, and thus some immediate decrease in direct injection may be used. Again, the hatched region indicates a gradual delay of additional injection to account for fuel stored in the intake manifold, and the dotted line indicates the total commanded fuel value.

Further, FIG. 7 also illustrates that because a direct injector provides the fuel directly into the combustion chamber, it is more suited to respond to rapid changes in fuel demand than the supplemental injector. In other words, when airflow or other conditions dictate variation in total fuel injection should vary, more of the variation can be achieved via a direct injector than a supplemental injector, for example.

Note that while the above transitions are exemplary, other transitions and/or adjustments may also be used. For example, transitions in combustion mode may also be present where relative amounts of fuel injection from multiple locations is adjusted. Further, if transitioning from supplemental homogenous combustion to direct injection stratified combustion, the engine may perform one or more homogeneous cycles with direct injection to reduce the fuel in the manifold before operating with stratified combustion.

As will be appreciated by one of ordinary skill in the art, the specific routines described herein in the flowcharts and the specification may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments of the invention described herein, but is provided for ease of illustration and description. Although not explicitly illustrated, one of ordinary skill in the art will recognize that one or more of the illustrated steps or functions may be repeatedly performed depending on the particular strategy being used. Further, these figures graphically represent code to be programmed into the computer readable storage medium in controller 12.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A method for controlling a first and second injector of an engine, the first injector located in a first cylinder of the engine and the second injector located upstream of, and configured to inject fuel into, the first and a second cylinder of the engine, the method comprising:
   decreasing total injection from the first and second injectors when decreasing injection from the second injector;
   increasing total injection from the first and second injectors when increasing injection of the second injector; and
   maintaining an exhaust air-fuel ratio about stoichiometry during said increasing and decreasing.

2. The method of claim 1 where said decreasing injection from the second injector includes disabling the second injector.

3. The method of claim 2 where said increasing injection from the second injector includes enabling the second injector.

4. The method of claim 3 further comprising adjusting fuel injection from the first injector based on an exhaust gas sensor in an exhaust of the engine when the first injector is enabled.

5. The method of claim 4 further comprising injecting fuel from the first injector during an intake stroke to form a homogenous mixture.

6. The method of claim 5 wherein said decreasing is performed in response to a fuel pressure reaching a threshold value.

7. The method of claim 1 wherein the second injector is a central fuel injector.

8. The method of claim 1 further comprising adjusting a fuel injection amount of the first injector to a greater extant than adjustment of the second injector top provide a change in total fuel injection demanded.

9. A system for a vehicle, comprising:
   an engine having at least a first and second cylinder;
   an intake manifold coupled to said engine;
   a first direct cylinder injector coupled to said first cylinder;
   a second direct cylinder injector coupled to said second cylinder;
   a supplemental fuel injector coupled to said intake manifold, said supplemental fuel injector configured to inject fuel that is delivered to at least said first and second cylinders; and
   a controller configured to adjust injection from at least said first, second, and supplemental fuel injector, where said controller is configured to increase a total injection amount from said injectors when enabling said supplemental injector, and to decrease a total injection amount from said injectors when enabling said direct fuel injection.

10. The system of claim 9 further comprising an additional supplemental fuel injector coupled to said intake manifold and configured to inject fuel that is delivered to at least said first and second cylinders.

11. The system of claim 9 where said controller is further configured to perform injection from said first and second direct cylinder injectors during respective intake strokes of the first and second cylinders.

12. The system of claim 11 wherein said controller is further configured to maintain an air-fuel ratio about stoichiometry when enabling said supplemental injector and when enabling said direct fuel injection.

13. The system of claim 12 wherein said controller is further configured to enable said direct fuel injection after fuel pressure reaches a threshold value.

14. The system of claim 12 wherein said controller is further configured to enable said direct supplemental injector when said direct injector nears a maximum injection amount.

15. The system of claim 12 wherein said adjusting is based on an estimate of fuel stored in an intake manifold.

16. A method for controlling a first and second injector of an engine, the first injector located in a first cylinder of the engine and the second injector located upstream of, and configured to inject fuel into, the first and a second cylinder of the engine, the method comprising:
   decreasing total injection from the first and second injectors when disabling injection from the second injector; and
   increasing total injection from the first and second injectors when enabling injection of the second injector, where an amount of said total injection is further adjusted in response to engine airflow and feedback from an exhaust gas oxygen sensor.

17. The method of claim 16 further comprising injecting fuel from the first injector at least during an intake stroke to form a homogenous mixture.

18. The method of claim 17 wherein the second injector is a central fuel injector.

* * * * *